US 7,817,984 B2

(12) United States Patent  (10) Patent No.: US 7,817,984 B2
Ishikawa et al.  (45) Date of Patent: Oct. 19, 2010

(54) MOBILE COMMUNICATION TERMINAL AND COMPUTER PROGRAM THEREOF, IC CARD AND COMPUTER PROGRAM THEREOF, AND MOBILE COMMUNICATION TERMINAL SYSTEM

(75) Inventors: Hidetoshi Ishikawa, Yokohama (JP); Teruaki Shiro, Tokyo (JP)

(73) Assignees: NTT DoCoMo, Inc. (JP); Dai Nippon Printing Co., Ltd. (JP)

( * ) Notice: Subject to any disclaimer, the term of this patent is extended or adjusted under 35 U.S.C. 154(b) by 580 days.

(21) Appl. No.: 11/616,083

(22) Filed: Dec. 26, 2006

(65) Prior Publication Data

US 2007/0167148 A1  Jul. 19, 2007

(30) Foreign Application Priority Data

Dec. 28, 2005  (JP)  ............................. 2005-379738

(51) Int. Cl.
 *H04M 11/00* (2006.01)
(52) U.S. Cl. .................... 455/405; 455/558; 455/556.1; 455/410; 455/411
(58) Field of Classification Search ................ 455/405, 455/558, 556.1, 410, 411
 See application file for complete search history.

(56) References Cited

U.S. PATENT DOCUMENTS

| 2003/0190908 | A1* | 10/2003 | Craven ........................ 455/411 |
| 2004/0043752 | A1* | 3/2004 | Matsumura .................. 455/405 |
| 2004/0087337 | A1* | 5/2004 | Takae et al. .................. 455/558 |
| 2005/0266885 | A1 | 12/2005 | Katayanagi | |

FOREIGN PATENT DOCUMENTS

| CN | 1132374 | 10/1996 |
| CN | 1151240 | 6/1997 |
| JP | 2002-094500 | 3/2002 |
| JP | 2002-135407 | 5/2002 |
| JP | 2002-300298 | 10/2002 |
| JP | 2003-198718 | 7/2003 |
| JP | 2004-086588 | 3/2004 |
| JP | 2004-151772 | 5/2004 |
| WO | WO 01/84490 | 11/2001 |

OTHER PUBLICATIONS

Notice of Reasons for Rejection issued to corresponding Chinese Application No. 200610168230.4, mailed Feb. 6, 2009.
Notice of Reasons for Rejection mailed Jul. 28, 2009 in corresponding Japanese Patent Application No. 2005-379738.

* cited by examiner

*Primary Examiner*—David Q Nguyen
(74) *Attorney, Agent, or Firm*—Ostrolenk Faber LLP

(57) ABSTRACT

A mobile communication terminal includes a communication unit, a wireless communication unit, a contents acquisition unit, a contents storage unit, a verification unit, and an output permission determination unit. The communication unit communicates with an IC card. The wireless communication unit provides wireless communication using user information stored in the IC card. The contents acquisition unit acquires contents using the user information. The contents storage unit stores the contents in a form so as to be associated with user identification information acquired from the IC card. The verification unit verifies whether or not the user identification information acquired from the IC card matches the user identification information, which is stored in the contents storage unit so as to be associated with contents to be outputted. The output permission determination unit determines whether or not output of the contents should be permitted, receiving verification results obtained by the verification unit.

15 Claims, 5 Drawing Sheets

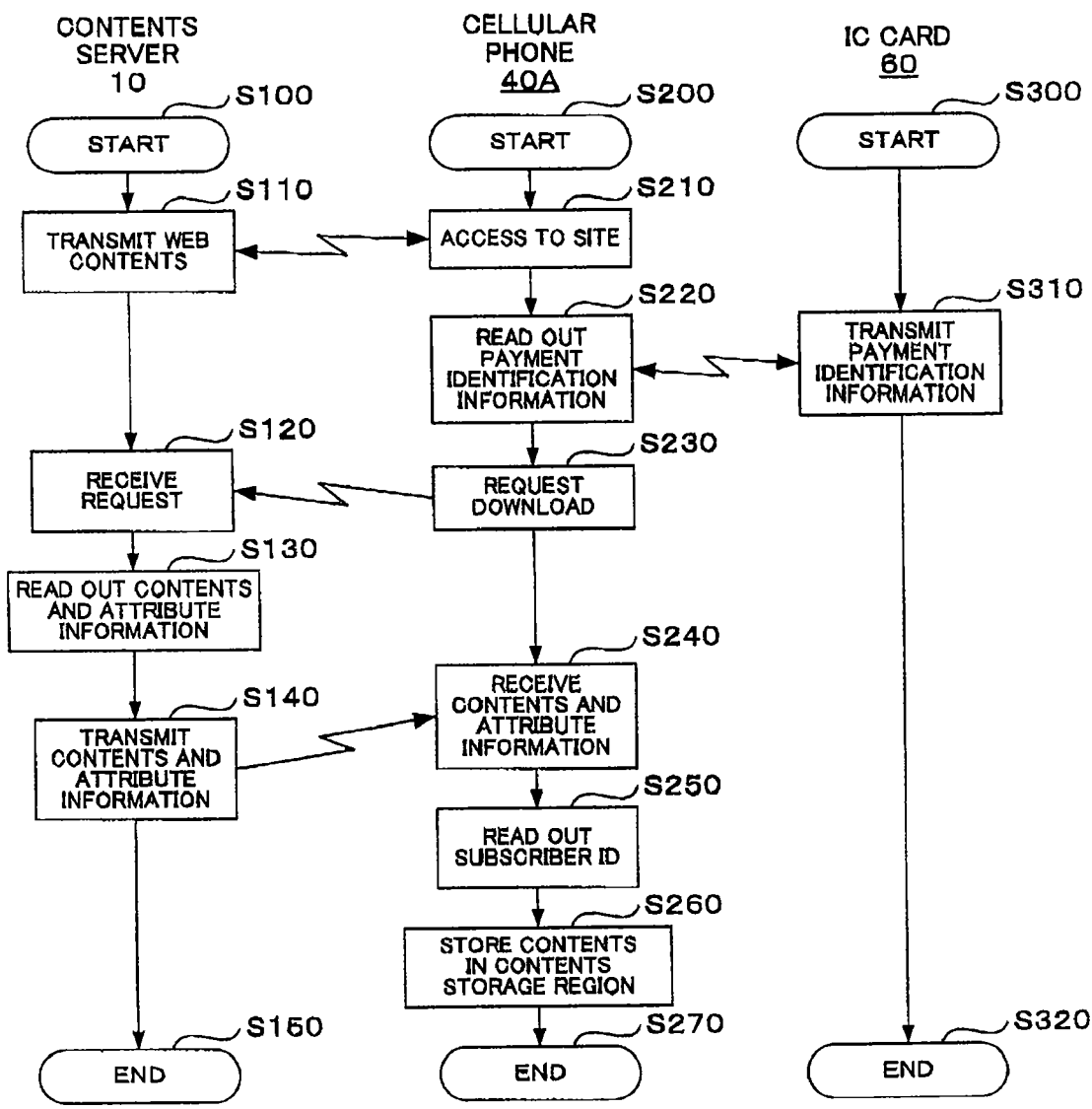

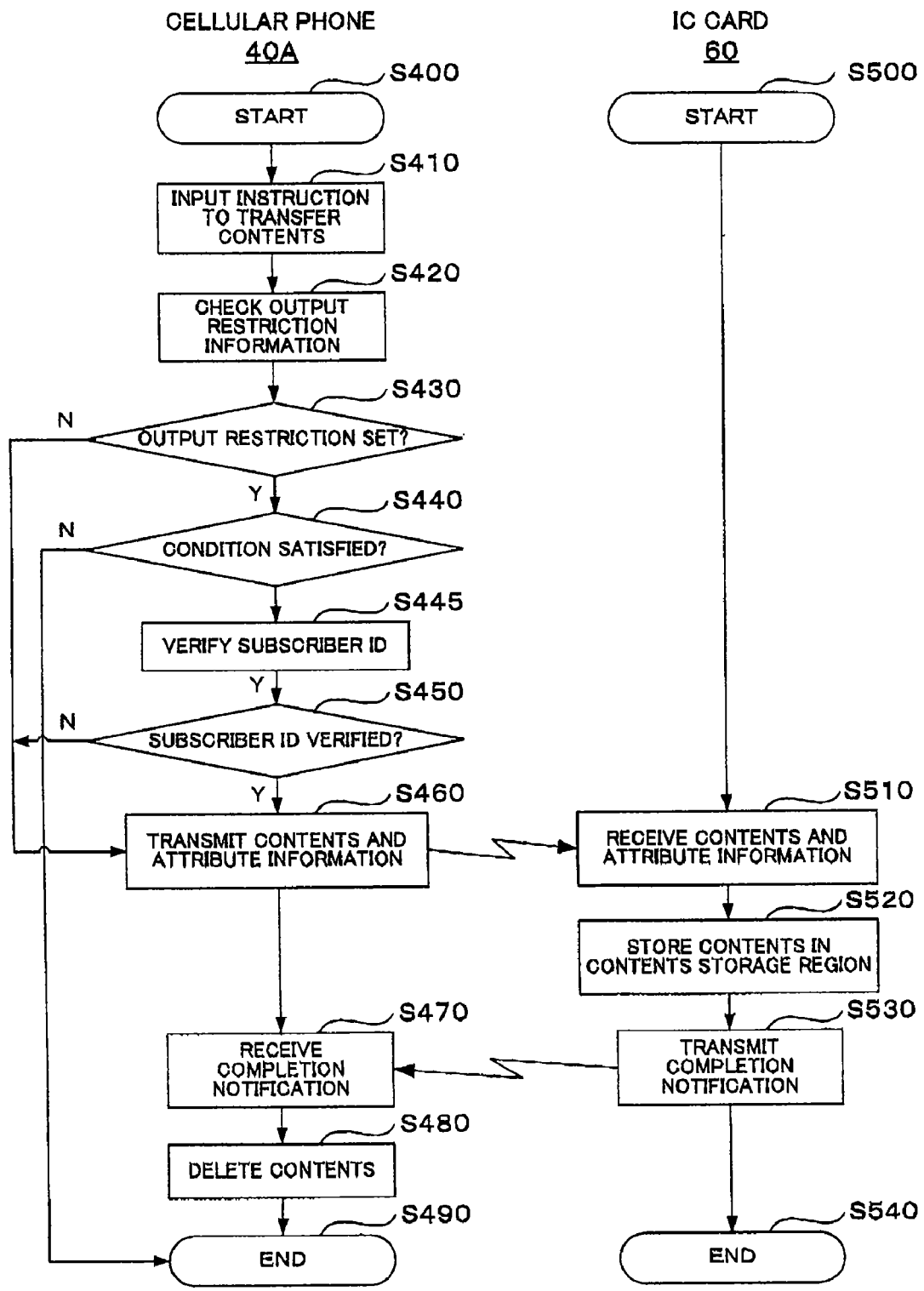

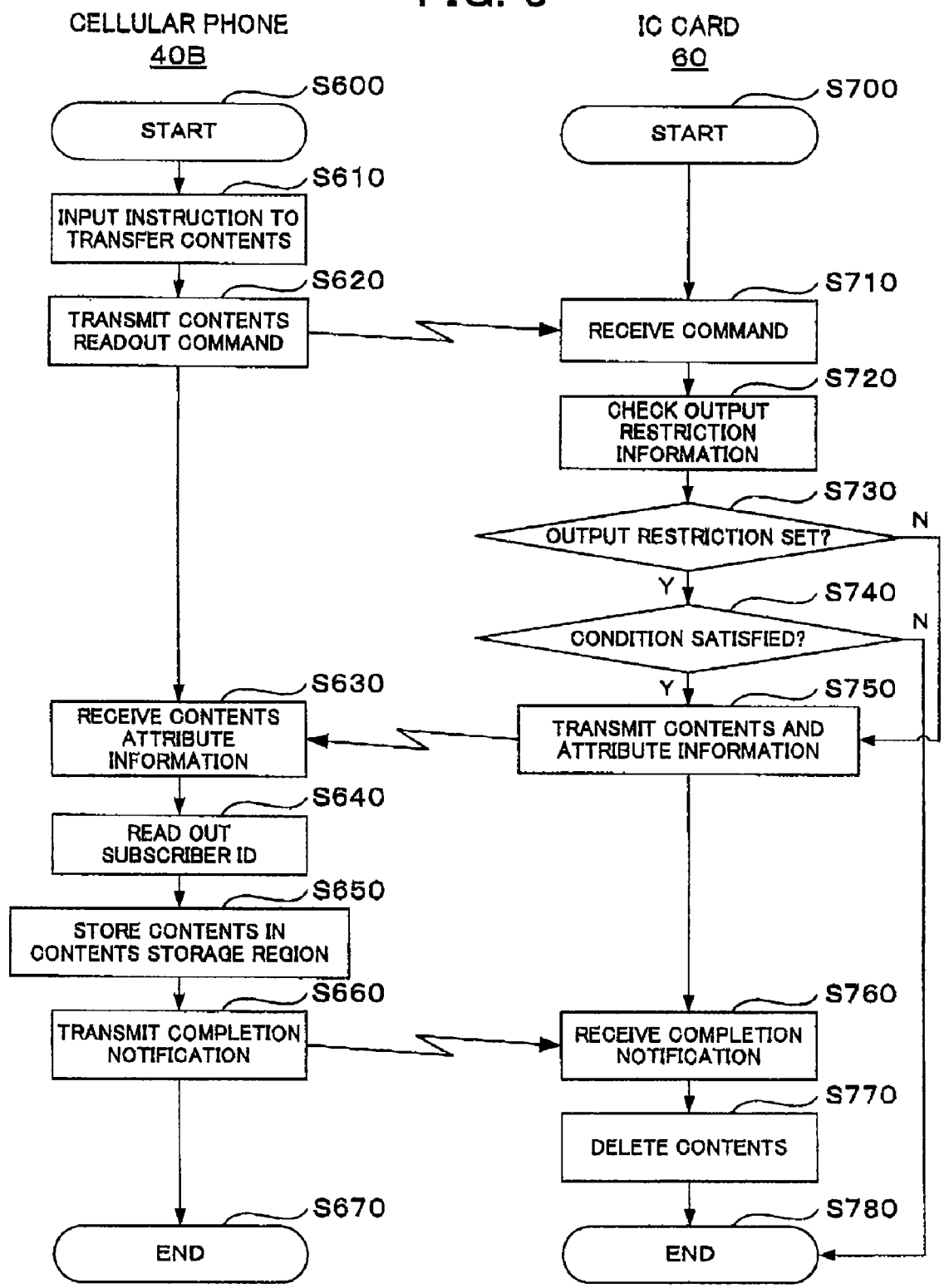

MOBILE COMMUNICATION TERMINAL AND COMPUTER PROGRAM THEREOF, IC CARD AND COMPUTER PROGRAM THEREOF, AND MOBILE COMMUNICATION TERMINAL SYSTEM

This application is based on and claims the benefit of priority from Japanese Patent Application No. 2005-379738, filed on Dec. 28, 2005, the content of which is incorporated herein by reference.

BACKGROUND OF THE INVENTION

1. Field of the Invention

The present invention relates to: a mobile communication terminal that provides wireless communication using user information stored in an IC card detachably mounted onto the mobile communication terminal, and a computer program thereof; an IC card which is to be mounted onto the aforementioned mobile communication terminal and which stores the user information, and a computer program thereof; and a mobile communication terminal system including the aforementioned mobile communication terminal and the aforementioned IC card.

2. Related Art

In recent years, the functions available in mobile communication terminals such as cellular phones have been becoming increasingly advanced. A cellular phone having a packet communication function provides a function of downloading various kinds of digital contents such as applications, images, and music, a function of storing such various kinds of content, and a function of replaying the content.

Also, development is being advanced with regard to cellular phones onto which a User Identity Module (which will be referred to as a "UIM" hereafter) is detachably mounted (see Patent document 1, for example). Here, the UIM is an IC card for storing subscriber information (user information) with respect to a subscriber of a mobile telephone service, such as a phone number, memory dial information, etc.

With such an arrangement, the subscriber information is stored in the UIM. Upon the user mounting a his/her own UIM onto the cellular phone of another user, the user can use the other user's cellular phone as if it were his/her own cellular phone. In this case, the charges incurred for using the cellular phone, for such purposes as a telephone call, packet communication, downloading of content, etc., are charged to the user identified based upon the subscriber information stored in the UIM.

The UIM has a small memory capacity. Accordingly, the body of the contents data is stored in a memory (a storage medium such as built-in memory, a memory card, or the like) of the cellular phone. In order to protect the content, the ability to output the contents stored in the memory of the cellular phone is restricted. Specifically, the contents stored in the cellular phone cannot be used (execution of an application, display of an image, replay of music) on a different cellular phone.

Patent Document 1: Japanese Unexamined Patent Application Publication No. 2002-135407

With such an arrangement, let us consider a case in which the user changes his/her own mobile communication terminal due to a malfunction, model change, or the like. This leads to following problems, which reduces the ease-of-use for the user.

With such an arrangement, the user can download the contents stored in the prior cellular phone to a new cellular phone with the UIM transferred from the prior cellular phone with contents execution restrictions. However, the use of the contents requires that the contents be downloaded again from the network, which imposes a packet communication charge on the user.

As another method, the user can transfer the contents stored in the cellular phone main unit to a server on the network in order to temporarily save the contents on the server. However, downloading the contents again also imposes a charge on the user.

As a yet another method, the data can be transferred to a new cellular phone via a subscriber information management system (this method is limited to contents for which permission to transfer the contents using this method has been granted beforehand by the contents management service). This method has a problem that all the contents cannot be transferred to the new cellular phone using this method.

On the other hand, let us consider an arrangement which permits the contents to be outputted to external circuits without restrictions. Such an arrangement allows the user to transfer the contents by recording the contents on a memory medium (SD card, MMC, etc.) having a large memory capacity. However, such an arrangement leads to a risk of illegal transference, a risk of illegal copying, etc., i.e., leading to contents protection problems.

SUMMARY OF THE INVENTION

In order to solve the aforementioned problems, an aspect of the present invention relates to a mobile communication terminal. A mobile communication terminal includes a communication unit, a wireless communication unit, a contents acquisition unit, a contents storage unit, a verification unit, and an output permission determination unit. The communication unit communicates with an IC card detachably mounted onto the mobile communication terminal. The wireless communication unit provides wireless communication using user information stored in the IC card. The contents acquisition unit acquires contents using the user information stored in the IC card. The contents storage unit stores the contents acquired by the contents acquisition unit in a form so as to be associated with user identification information acquired from the IC card. The verification unit verifies whether or not the user identification information acquired from the IC card matches the user identification information, which is stored in the contents storage unit so as to be associated with contents to be outputted, when the contents stored in the contents storage unit are outputted to the IC card. The output permission determination unit determines whether or not output of the contents should be permitted, receiving verification results obtained by the verification unit.

Another aspect of the present invention relates to a storage medium encoded with a machine readable computer program code, which instructs a mobile communication terminal to perform wireless communication using user information stored in an IC card detachably mounted to the mobile communication terminal. The storage medium includes instructions for causing a computer to implement a method for executing functions of each unit of the mobile communication terminal according to the first aspect of the present invention.

Still another aspect of the present invention relates to an IC card which is mounted onto a mobile communication terminal. The IC card includes a user information storage unit, a communication unit, a contents storage unit, and an output permission determination unit. The user information storage unit stores user information which is to be used by the mobile communication terminal for performing wireless communication. The communication unit communicates with the mobile communication terminal onto which the IC card is mounted. The contents storage unit stores contents received via the mobile communication terminal and output restriction information with respect to the contents. When the output permission determination unit receives an output instruction to output the contents from the mobile communication terminal, the output permission determination unit determines whether or not output of the contents to the mobile communication terminal should be permitted, based upon the output restriction information with respect to the contents and attributes of the mobile communication terminal.

Yet another aspect of the present invention relates to a storage medium encoded with a machine readable computer program code for executing an IC card that stores user information, which is used by a mobile communication terminal for wireless communication. The storage medium includes instructions for causing a computer to implement a method for executing functions of each unit of the IC card.

A further aspect of the present invention relates to a mobile communication terminal system. The mobile communication terminal system includes a mobile communication terminal and an IC card described above.

A still further aspect of the present invention also relates to a mobile communication terminal system. The mobile communication terminal system includes an IC card and a mobile communication terminal. The IC card includes a user information storage unit that stores user information, and a communication unit that externally communicates. The mobile communication terminal includes a card communication unit that communicates with the IC card detachably mounted onto the mobile communication terminal, a wireless communication unit that conducts wireless communication using user information stored in the IC card, a contents acquisition unit that externally acquires contents via the wireless communication unit, and a contents reproduction unit that reproduces and executes the contents acquired by the contents acquisition unit. The contents acquisition unit acquires contents which can be divided into a first part and a second part. Furthermore, the mobile communication terminal includes a first contents storage unit that stores the first part of the contents, the mobile communication terminal transmitting the second part of the contents to the IC card via the communication unit. The IC card further includes a second contents storage unit that stores the second part of the contents received via the communication unit. The contents reproduction unit performs reproduction and execution of the contents using the first part of the contents stored in the first contents storage unit and the second part of the contents stored in the second contents storage unit of the IC card.

The mobile communication terminal and the computer program thereof, the IC card and the computer program thereof, and the mobile communication terminal system, according to the present invention, provide the following advantages:

With such an arrangement, determination is made whether or not output of the contents from the mobile communication terminal to the IC card should be permitted, based upon the comparison between the user identification information stored in the IC card mounted at the time of acquisition of the contents and the user identification information stored in the IC card which is now a destination to transmit the contents. Such an arrangement restricts the output destination for the contents to the IC card of the user who has acquired the contents, thereby protecting the contents.

With such an arrangement, payment for acquired contents is made using the user information stored in the IC card. Such an arrangement is able to restrict the output destination for the contents to the IC card of the user who has made proper payment.

With such an arrangement, determination is made whether or not output of the contents should be permitted, based upon the contents output restriction information and the comparison results. Such an arrangement is able to restrict output of the contents to the IC card depending on the need for protection.

With such an arrangement, after output of the contents to the IC card has been completed, the stored contents are deleted, thereby preventing duplication of the contents.

With such an arrangement, the communication unit includes the second interface compliant with a memory card standard or a USB standard. Such an arrangement provides high-speed communication, thereby enabling communication processing for large-size contents to be completed in a short period of time.

With such an arrangement, the IC card determines whether or not output of the contents to the mobile communication terminal should be permitted, based upon the output restriction information with respect to the contents and the attributes of the mobile communication terminal which is the output destination for the contents. Such an arrangement restricts the output destination for the contents to the mobile communication terminal having predetermined attributes, thereby enabling protection of the contents.

With such an arrangement, the contents are transferred from a mobile communication terminal to another mobile communication terminal via the IC card. Such an arrangement enables the contents to be transferred from a mobile communication terminal to another mobile communication terminal while protecting the contents.

With such an arrangement, the contents are reproduced or executed using the first part of the contents stored in the mobile communication terminal and the second part stored in the IC card. With such an arrangement, reproduction and execution of the contents requires the IC card that stores the second part. Such an arrangement restricts reproduction and execution of the contents, thereby enabling protection of the contents. Also, an arrangement may be made which permits duplication of the first part of the contents. With such an arrangement, in a case that the IC card is mounted to any one of the multiple mobile communication terminals that store the first part, the contents can be reproduced and executed. With such an arrangement, in a case of replacing the mobile communication terminal with another one due to model change, for example, a duplicate of the first part is stored in the new mobile communication terminal, thereby also permitting the new mobile communication terminal to reproduce and execute the contents. Such an arrangement improves ease-of-use while protecting the contents.

BRIEF DESCRIPTION OF THE DRAWINGS

FIG. 3 is a flowchart which shows operations of the mobile communication terminal, the IC card, and the mobile communication terminal system, and computer programs for the mobile communication terminal and the IC card;

FIG. 4 is a flowchart which shows operations of the mobile communication terminal, the IC card, and the mobile communication terminal system, and computer programs for the mobile communication terminal and the IC card; and FIG. 5 is a flowchart which shows operations of the mobile communication terminal, the IC card, and the mobile communication terminal system, and computer programs for the mobile communication terminal and the IC card.

DETAILED DESCRIPTION OF THE INVENTION

The present invention provides a mobile communication terminal and a computer program thereof, an IC card and a computer program thereof, and a mobile communication system, which together provide a function of allowing a user to transfer digital contents from one mobile communication terminal to another while ensuring protection of the contents.

a. Embodiment 1

Detailed description will be made below regarding an embodiment of the present invention with reference to the drawings.

Figure 1:
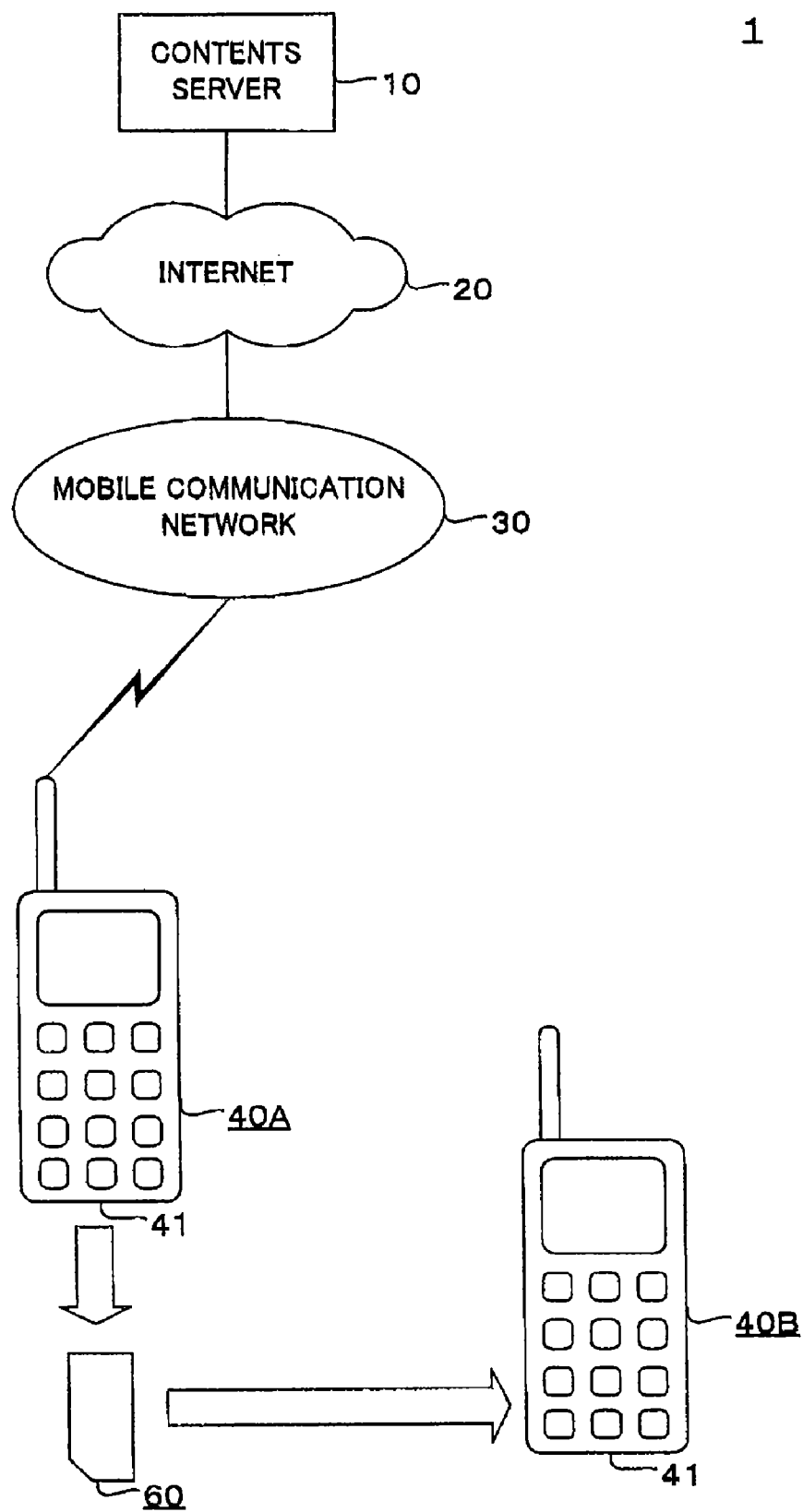
FIG. 1 is a diagram which shows schematic configurations of a wireless communication terminal, an IC card, and a wireless communication terminal system.

FIG. 1 is a diagram which shows a schematic configuration of a wireless communication terminal, an IC card, and a wireless communication terminal system. In the present embodiment, each of the cellular phones 40A and 40B serves as a wireless communication terminal.

As shown in FIG. 1, a wireless communication terminal system 1 includes: a contents server 10; an Internet 20; a mobile communication network (packet exchange network) 30; the cellular phones 40A and 40B; an IC card 60 which is detachably mounted onto a mounting portion 41 of each cellular phone 40; etc. The wireless communication terminal system 1 provides a function to allow transferring the contents, which have been provided to the cellular phone 40A by the contents server 10, from the cellular phone 40A to the cellular phone 40B via the IC card 60.

Note that cellular phones such as the cellular phones 40A and 40B can have various configurations. However, cellular phones such as the cellular phones 40A and 40B have generally the same configuration according to the present invention. Accordingly, the cellular phones 40A and 40B will be collectively referred to as the "cellular phones 40" when description will be made for the components that are the same in the cellular phones 40A and 40B. On the other hand, description of the functions that differ between the cellular phones 40A and 40B will be made with reference to each of the cellular phones 40A and 40B.

The contents server 10 has a function of providing packet communication with the cellular phones 40 via the Internet 20 and the mobile communication network 30. The contents server 10 stores various contents such as programs, image data, music data, etc., which can be provided to the cellular phones 40. The contents include an application program which can be executed by the cellular phones 40.

The mobile communication network 30 provides packet communication service to the cellular phones 40 within a predetermined service provision area, and includes gateway servers, base stations, etc. (not shown). Note that the wireless communication terminal system 1 includes a mobile communication network (not shown) as a line exchange network, in addition to the mobile communication network 30. The mobile communication network as the line exchange network provides a general mobile telephone call service to the cellular phones 40 within the predetermined service provision area.

The gateway server provides the cross-connection between the Internet 20 and the mobile communication network 30. The gateway server provides a function of interconversion between the communication protocol for the Internet 20 and the communication protocol for the mobile communication network 30. With such an arrangement, data exchange is performed between the Internet 20 and the mobile communication network 30 via the gateway server. The communication service area provided by the mobile communication network 30 has a great number of base stations. Each base station provides a wireless communication cell within which a cellular phone 40 is able to perform wireless communication via the base station.

Figure 2:
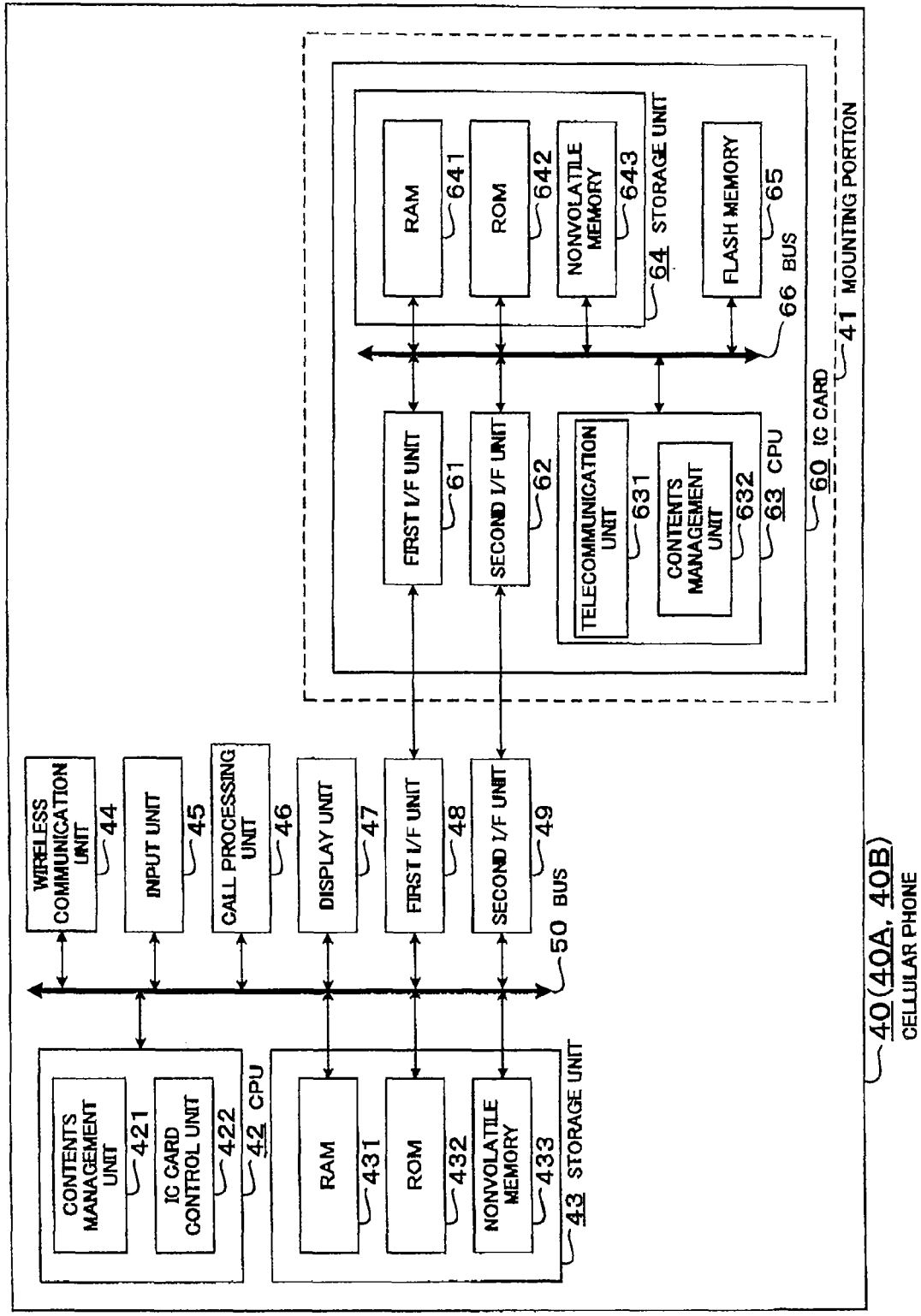
FIG. 2 is a block diagram which shows configurations of the wireless communication terminal and the IC card.

As shown in FIG. 2, the IC card 60 is a mobile information storage medium for storing the information with respect to the user of the IC card 60 (which will be referred to as "user information" hereafter). The IC card 60 includes: a CPU 63; a first I/F 61 connected to the CPU 63 via a system bus 66; a second I/F 62; a storage unit 64; a flash memory 65; etc., and has the same functions as those of a conventional UIM and the same functions as those of a memory card. For example, the IC card 60 has the same configuration as that of an IC card in which a Subscriber Identify Module (SIM) is mounted onto a memory card according to the MMC standard (multimedia card, which is a trademark) in order to provide a multi-bank function, a multi-function, etc., while maintaining compatibility with the MMC standard (see International Publication WO 1/84480).

Each of the first I/F 61 and the second I/F 62 is an interface for controlling communication with the cellular phone 40. The first I/F 61 is a communication interface according to a general IC card standard such as ISO/IEC 7816 or the like. Also, external terminals, communication protocols, and commands for the first I/F 61 are in accordance with the general IC card standard. In this way, communication is conducted between the first I/F 61 and a first I/F 48 of the cellular phone 40. On the other hand, the second I/F 62 is a communication interface according to a general memory card standard such as a multimedia card (trademark, which will be referred to as an "MMC" hereafter), an SD card, or the like. Also, external terminals, communication protocols, and commands of the second I/F 62 are in accordance with the general memory card standard. In this way, communication is conducted between the second I/F 62 and a second I/F 49 of the cellular phone 40. Accordingly, the communication via the second I/F 62 exhibits a higher communication speed than that provided via the first I/F 61. Such an arrangement enables completion of communication processing of large-size contents in a short period of time.

The storage unit 64 includes RAM 641, ROM 642, and a nonvolatile memory 643 such as EEPROM, and serves as a storage device for storing various programs and data. The RAM 641 is a volatile memory, and is used by the CPU 63 as a working area. Specifically, the RAM 641 temporarily stores programs which are to be executed by the CPU 63, and various data sets. The ROM 642 stores various programs which are to be executed by the CPU 63 such as an operating system (which will be referred to as an "OS" hereafter).

The nonvolatile memory 643, which is a rewritable nonvolatile memory, stores various programs and data sets for instructing the IC card 60 to operate primarily as a UIM, such as a telecommunication application for providing functions as a UIM, a contents management application, a card ID, user information, etc. The user information is information on the user of the IC card 60, including payment identification information such as subscriber information, credit card number, bank account number, etc., history information with respect to calls, incoming calls, etc., telephone directory information, etc. Calls and packet communications via the cellular phone 40 require the subscriber information. That is to say, the subscriber information is necessary before the subscriber receives the communication service. Specifically, the subscriber information includes the subscriber ID for identifying the subscriber (user) such as a phone number of the subscriber, etc., the identification information for identifying a communication service provider which provides the communication service to the subscriber, and an encryption key for authentication of the subscriber. Here, the subscriber ID is assigned by the communication service provider to the subscriber (user), according to a subscriber contract for the communication service via the IC card 60. The subscriber ID thus assigned is stored in the nonvolatile memory 643.

The flash memory 65, which is a rewritable nonvolatile memory, stores contents outputted from the cellular phone 40 and attribute information with respect to the content. The attribute information of the contents is the information which indicates attributes of the contents. Specifically, the attribute information includes: contents identification information such as a contents name for identifying contents; information with respect to a kind of contents; output restriction information, which specifies not only whether or not external outputting of contents is restricted, but also the details of output restrictions; a data size of contents; etc. The flash memory 65 has a protected contents storage region and a non-protected contents storage region. With such an arrangement, the flash memory 65 stores contents having output restrictions in the protected contents storage region. On the other hand, the flash memory 65 stores contents without output restrictions in the non-protected contents storage region.

The CPU 63 controls each of the device components connected to one another via the system bus 66, e.g., controls the communication with the cellular phone 40 by executing various programs stored in the ROM 642 and the nonvolatile memory 643. The CPU 63 executes a telecommunication application so that a telecommunication unit 631 executes processing as a UIM. Also, the CPU 63 executes a contents management application so as to activate a contents management unit 632. Examples of the processing as a UIM include the user authentication for determining whether or not a user is authenticated as a proper user by verifying whether or not the password inputted by the user via the cellular phone 40 matches the password registered beforehand in the nonvolatile memory 643. The contents management unit 632 performs processing for managing contents received from the cellular phone 40. Upon reception of a contents output command from the cellular phone 40, the unit 632 determines whether or not output of the contents to the wireless communication terminal is allowable based upon the analysis results of whether or not the conditions specified in the contents output restriction information match the attributes of the cellular phone 40 (see FIG. 5 described later).

As shown in FIG. 1, each cellular phone 40 performs wireless communication with a corresponding base station that provides a corresponding wireless communication cell. With such an arrangement, each cellular phone 40 serves as a wireless communication terminal that provides communication services such as packet communication service, call service, etc. The cellular phone 40 provides a function of downloading the contents provided by the contents server 10 by performing packet communication with the contents server 10.

As shown in FIG. 2, the cellular phone 40 includes: the mounting portion 41; a CPU 42; a storage unit 43 connected to the CPU 42 via a system bus 50; a wireless communication unit 44; an input unit 45; a call processing unit 46; a display unit 47; the first I/F 48; the second I/F 49; etc.

The mounting portion 41 allows the IC card 60 having a predetermined shape to be detachably mounted.

The wireless communication unit 44 includes an antenna etc., and, under the control of the CPU 42, provides wireless communication with a corresponding base station. Specifically, the wireless communication unit 44 creates a transmission signal by superimposing the data with respect to voice transmission or the packet communication data on a carrier wave, and transmits the transmission signal thus created to the base station via the antenna. Furthermore, the wireless communication unit 44 receives a radio signal, which has been transmitted from the base station, via the antenna, and decodes the radio signal into audio data or the packet communication data.

The input unit 45 includes multiple keys, which allows the user to input numbers, letters, operation instructions, etc. The input unit 45 outputs an operation signal to the CPU 42 in response to the operation of the keys.

The call processing unit 46 includes an audio input/output device such as a microphone, speaker, or the like, an audio processing unit, etc. The call processing unit 46 performs call processing including call connection/disconnection processing under the control of the CPU 42.

The display unit 47 is a display device such as a display or the like.

Each of the first I/F 48 and the second I/F 49 is a communication interface that provides communication with the IC card 60 mounted onto the cellular phone 40. Specifically, the first interface I/F 48 is a communication interface that provides communication according to a general IC card standard, and communicates with the first I/F 61 of the IC card 60. On the other hand, the second interface I/F 49 is a communication interface that provides communication according to a general memory card standard, and communicates with the second I/F 62 of the IC card 60. The second I/F 49 exhibits a higher communication speed than that provided via the first I/F 48. This enables quick completion of communication processing for large-size contents.

The storage unit 43 includes RAM 431, ROM 432, and a rewritable nonvolatile memory 433 such as SRAM, EEPROM, or the like. The storage unit 43 is a storage device for storing various programs and data sets. The ROM 432 stores various programs which are to be executed by the CPU 42. For example, the ROM 432 stores an OS for the cellular phone 40, a Web browser, software for building an execution environment for Java (trademark).

The nonvolatile memory 433 stores application programs and various data sets. The nonvolatile memory 433 has a subscriber information storage region for storing the subscriber information read out from the IC card 60 mounted onto the mounting portion 41, a contents storage region for storing the contents downloaded from the contents server 10 and the attribute information with respect to the content, etc. Furthermore, the contents storage region is partitioned into a protected contents storage region for storing protected contents and a non-protected contents storage region for storing non-protected contents. At the time of downloading, the contents downloaded from the contents server 10 and the attribute information with respect to the contents are associated with the subscriber ID included in the subscriber information which has been stored in the subscriber information storage region. The data set in which the contents and the corresponding attribute information are associated with the subscriber ID is stored in the contents storage region.

Upon mounting the IC card 60 onto the mounting portion 41, the subscriber information read out from the IC card 60 is stored in the subscriber information storage region. That is to say, the subscriber information storage region stores the same subscriber information as that stored in the IC card 60 which is currently mounted onto the mounting portion 41.

The CPU 42 is a central processing unit for performing computation and control. Specifically, the CPU 42 controls each of the components connected to one another via the system bus 50, and provides a contents management unit 421, an IC card control unit 422, etc., by executing various programs.

The IC card control unit 422 performs processing with respect to the IC card 60 such as communication with the IC card 60 mounted onto the mounting portion 41 via the first I/F 48, transmission of a command, analysis of a received response, etc. Upon mounting the IC card 60 onto the mounting portion 41, the IC card control unit 422 reads out predetermined subscriber information from the IC card 60, and stores the subscriber information in the subscriber information storage region.

The contents management unit 421 downloads contents from the contents server 10, stores the contents in the contents storage region of the nonvolatile memory 433, and manages the content. In a case of downloading contents from the contents server 10, the contents management unit 421 reads out the personal identification information used for payment, which is stored in the IC card 60 mounted onto the mounting portion 41. The personal identification information is used for payment for downloaded content. That is to say, the contents provider provides the contents to the user of the IC card 60, and permits the user to use the content, in exchange for the payment.

In a case of downloading contents from the contents server 10, the contents management unit 421 stores the subscriber information stored in the subscriber information storage region, i.e., the subscriber ID stored in the IC card 60 mounted onto the mounting portion 41 at the time of the contents being downloaded, in the contents storage region in association with the contents thus downloaded.

On the other hand, in a case of reception of an instruction to output the contents stored in the contents storage region to the IC card 60, the contents management unit 421 verifies whether or not the subscriber ID stored in the subscriber information storage region, i.e., the subscriber ID stored in the IC card 60 currently mounted to the mounting portion 41, matches the subscriber ID that is stored in the contents storage region in association with the contents targeted for output. In a case that determination has been made that these subscriber IDs match each other, the contents management unit 421 permits the output of the content, whereupon the contents are outputted to the IC card 60 via the second I/F 49. That is to say, the contents management unit 421 restricts the output destination for the contents stored in the contents storage region to the IC card 60 which has been mounted onto the mounting portion 41 when the contents are downloaded. That is to say, the contents management unit 421 restricts the destination for the contents to the IC card 60 of the user who has permission to use the contents (see FIG. 4 described later).

Furthermore, in a case of reception of an instruction to read out the contents stored in the IC card 60 mounted onto the mounting portion 41, the contents management unit 421 transmits a predetermined command to the IC card 60 so as to read out the content. Then, the contents management unit 421 stores the user identification information for the IC card 60 and the contents thus received in the contents storage region in association with each other (see FIG. 5 described later).

FIG. 3 shows a process executed by the cellular phone 40A for downloading contents such as a Java application from the contents server 10. Description will be made below mainly regarding the process executed by the CPU 42 of the cellular phone 40A.

In Step 200 and Step 300 ("Step" will be abbreviated to "S" hereafter), the IC card 60 is mounted to the cellular phone 40A, and the subscriber information stored in the IC card 60 is stored in the subscriber information storage region of the cellular phone 40A.

Then, a user operates the input unit 45 of the cellular phone 40A so as to give an instruction to activate a Web browser. The cellular phone 40A displays a WWW page for downloading contents or the like, which is provided by the contents server 10, on the display unit 47 (S110, S210). Upon the user giving an instruction to download content, the cellular phone 40A reads out the payment identification information from the IC card 50 (S220, S310), and transmits the payment identification information to the contents server 10. At the same time, the cellular phone 40A transmits a download request to the contents server 10 via the wireless communication unit 44 (S230). The download request includes a command which is an instruction to download contents and the information that specifies the contents to be downloaded. Upon the contents server 10 receiving the download request from the cellular phone 40A (S120), the contents server 10 reads out the contents and the attribute information as specified in the request (S130), and transmits the contents and the attribute information to the cellular phone 40A (S140).

Upon reception of the contents and the attribute information (S240), the cellular phone 40A reads out the subscriber ID stored in the subscriber information storage region (S250). Note that, upon mounting the IC card 60 to the mounting portion 41, the subscriber ID acquired from the IC card 60 is stored in the subscriber information storage region. The cellular phone 40A stores the data set, in which the subscriber ID thus read out is associated with the contents and the attribute information thus downloaded, in the contents storage region of the nonvolatile memory 433 (S260). Note that based upon the attribute information, the cellular phone verifies whether or not the contents to be stored are protected contents with output restrictions. Then, the cellular phone stores the contents in the protected contents storage region or the non-protected contents storage region based upon the verification results.

FIG. 4 shows a process for transferring contents from the cellular phone 40A to the IC card 60. Description will be made below mainly regarding the process executed by the CPU 42 of the cellular phone 40A and the CPU 63 of the IC card 60.

In S400 and S500, the IC card 60 is mounted onto the cellular phone 40A, and the subscriber information stored in the IC card 60 is stored in the subscriber information storage region of the cellular phone 40A.

The user gives an instruction to activate the contents management application. Then, the user specifies the contents to be outputted by operating the input unit 45 according to a screen displayed on the display unit 47 thus activated, and gives an instruction to outputting the contents to the IC card 60. The cellular phone 40A receives a contents output instruction including the contents identification information (S410).

The cellular phone 40A verifies whether or not the contents targeted for output have output restrictions that place restrictions on outputting to the IC card 60, i.e., whether the contents targeted for output are protected contents or non-protected contents, based upon the output restriction information included in the attribute information with respect to the contents thus specified (S420). In a case that the contents targeted for output are non-protected contents without output restrictions, the flow proceeds to S460 (S430).

On the other hand, in a case that the contents targeted for output are protected contents with output restrictions, determination is made based upon the output restriction information whether or not the output permission condition is satisfied (S430, S440). In a case that determination has been made that the output permission condition is not satisfied, the cellular phone 40A ends this process (S490).

On the other hand, in a case that determination has been made that the output permission condition is satisfied, the cellular phone 40A verifies whether or not the subscriber ID stored in the subscriber information storage region, i.e., the subscriber ID of the user of the IC card 60 currently mounted onto the mounting portion matches the subscriber ID stored in association with the contents thus specified (S445). In a case that these subscriber IDs do not match each other, an error occurs. In this case, the cellular phone 40A displays a notification to that effect on the display unit 47, and ends the process without outputting the contents (S450, S490).

On the other hand, in a case that the subscriber IDs match each other, the cellular phone 40A permits output of the contents to the IC card 60, outputting the contents and the attribute information with respect to the contents to the IC card 60 (S450, S460).

Upon the IC card 60 receiving the contents and the attribute information (S510), the IC card 60 checks whether or not the contents are to be protected, and stores the contents in the protected contents storage region or the non-protected contents storage region (S520).

After the completion of storage of the content, the IC card 60 transmits a notification to that effect to the cellular phone 40A (S530). Upon reception of the notification (S470), the cellular phone 40A removes the contents thus outputted from the contents storage region (S480), whereupon the process ends (S490).

FIG. 5 shows a process for transferring contents from the IC card 60 to the cellular phone 40B. Description will be made below mainly regarding the process executed by the CPU 42 of the cellular phone 40B and the CPU 63 of the IC card 60.

The user gives an instruction to activate the contents management application. Then, the user specifies the contents to be transferred by operating the input unit 45 according to a screen displayed on the display unit 47 thus activated, and gives an instruction to transfer the contents from the IC card 60 to the cellular phone 40B. The cellular phone 40B receives the instruction (S610).

The cellular phone 40B transmits a readout command for the contents thus specified and the corresponding attribute information to the IC card 60 (S620). Upon reception of this command (S710), the IC card 60 checks whether or not the contents have output restrictions based upon the output restriction information included in the attribute information with respect to the contents (S720). In a case that the contents have no output restrictions, the flow proceeds to Step S750.

On the other hand, in a case that the contents have output restrictions, the IC card 60 determines whether or not the output permission condition is satisfied for the output of the contents according to the command received from the cellular phone 40B, with reference to the output restriction information stored in the attribute information with respect to the contents thus specified (S740). For example, the IC card 60 receives the attribute information with respect to the cellular phone 40B from the cellular phone 40B. Then, the IC card 60 verifies whether or not the cellular phone 40B has a contents protection function, and which maker the cellular phone 40B was manufactured by, etc. The IC card 60 determines whether or not the output permission condition is satisfied based upon the verification results.

In a case that the output permission condition is not satisfied, an error occurs, failing in the contents output. In this case, the IC card 60 notifies the cellular phone 40B to that effect, whereupon this process ends (S780). On the other hand, in a case that the output permission condition is satisfied, the IC card 60 outputs the contents and the corresponding attribute information to the cellular phone 40B (S750).

Upon reception of the contents and the attribute information (S630), the cellular phone 40B reads out the subscriber ID from the subscriber information storage region (S640), and stores the data set, in which the subscriber ID thus read out is associated with the contents and the attribute information thus received, in the protected contents storage region or the non-protected contents storage region (S650).

After the completion of the storage of the content, the cellular phone 40B transmits a notification to the IC card 60 to that effect (S660). Upon reception of this notification (S760), the IC card 60 removes the contents thus outputted from the contents storage region (S770), whereupon this process ends (S780).

As described above, with the present embodiment, determination is made whether or not output of the contents from the cellular phone 40A to the IC card 60 should be permitted, based upon the verification result obtained by verifying whether or not the subscriber ID stored in the IC card 60, which has been mounted onto the cellular phone 40A when the contents are acquired, matches the subscriber ID stored in the destination IC card 60. Such an arrangement enables the output destination for the contents to be restricted to the IC card 60 of the user who has acquired the content.

Furthermore, the cellular phone 40A restricts the contents destination to the IC card 60, which stores the payment identification information used to pay for the content. Such an arrangement restricts the output destination of the contents to the IC card of the user who has paid for the content.

Furthermore, the cellular phone 40A determines whether or not the output of the contents should be permitted, based upon the output restriction information and the verification result. Such an arrangement controls the output of the contents to the IC card 60 according to the need to protect the contents.

Furthermore, upon completion of output of the contents from the cellular phone 40A to the IC card 60, the cellular phone 40A deletes the contents that have been stored in the cellular phone 40A. Such an arrangement prevents duplication of the contents, resulting in a protection of the contents.

Furthermore, the IC card 60 determines whether or not the output of the contents to the cellular phone 40B should be permitted, based upon the contents output restriction information and the attributes of the cellular phone 40B which is the destination to transmit the content. Such an arrangement restricts the contents destination to a cellular phone 40B having predetermined attributes, thereby providing a protection of the contents.

Furthermore, the contents are transferred from the cellular phone 40A to the cellular phone 40B via the IC card 60. Such an arrangement allows a transfer of the contents from the cellular phone 40A to the other cellular phone 40B while protecting the contents. For example, in a case of replacing the cellular phone 40A with another cellular phone due to a model change or a malfunction, such an arrangement allows a transfer of the contents from the cellular phone 40A to another cellular phone while protecting the contents, thereby improving ease-of-use for the user.

b. Modifications

The present invention is not restricted to the embodiments described above. Rather, various modifications and changes may be made, which are within a scope of the present invention.

For example, description has been made in the embodiment 1 regarding an arrangement in which the wireless communication terminal system 1 employs the subscriber ID such as a phone number or the like as the user identification information. However, the user identification information is not restricted to the subscriber ID. The personal identification information used for payment or the card identification information for identifying the IC card 60 may be alternatively employed as the user identification information.

Description has been made regarding an arrangement in which the IC card 60 stores the contents and the attribute information in the flash memory 65. An arrangement may be alternatively made in which the contents and the attribute information are stored in a contents storage region provided in the nonvolatile memory 643. That is to say, it may be selectable where the contents and the attribute information are stored.

Let us consider a case in which the contents are an application. In this case, an arrangement may be made in which the contents are divided into two parts, i.e., a first part and a second part, and the first part is stored in the cellular phone 40 (first contents storage unit), and the second part is stored in the IC card 60 (second contents storage unit) such that the second part is prevented from being transferred from the IC card 60 to the cellular phone 40. With such an arrangement, the application is executed by calling the functions of the first part stored in the cellular phone 40 and the functions of the second part stored in the IC card 60 (contents reproducing unit). That is to say, with such an arrangement, the functions of one part (the second part; these functions are mandatory for execution of the program) of the application program are stored in the IC card 60. On the other hand, the other part (the first part) of the program is stored in the cellular phone 40. While executing the application program, the cellular phone 40 calls the program stored in the IC card 60. In this case, it may be possible to select one of the following approaches: the IC card 60 executes the program stored in the IC card 60 or the cellular phone 40 executes the program read out from the IC card 60. In this way, it is not possible to execute the application without the program stored in the IC card 60. Therefore, such an arrangement is able to impose restrictions on execution of the application.

When the cellular phone 40 downloads contents, it may be possible to directly store a part (the second part) of the contents in the IC card 60. It may be alternatively possible for the cellular phone 40 to temporarily store the entire contents. In this case, when the cellular phone 40 transfers these contents via the IC card 60 to another cellular phone 40, it may be possible to leave a part of the functions of the application in the IC card 60.

Let us consider a case in which the same functions of a part (the second part) are extracted from the application program in every case. In this case, it may be that the application can be executed in the cellular phone 40 irrespective of an IC card 60 mounted onto the cellular phone 40.

In order to solve the aforementioned problem, a serial number, an authentication key, or the like should be downloaded along with the content. With such an arrangement, authentication is performed using these additional items for the application stored in the cellular phone 40 and the application stored in the IC card 60. If the authentication is successful, the program should be executed. Also, an arrangement may be made in which the second part extracted from the program is changed in every case, i.e., there are multiple division patterns of the second parts. With such an arrangement, a serial number is assigned to each division pattern. If the pattern numbers match one another, execution of the program is permitted. Otherwise, execution of the program is prevented. In this way, it may be possible for the cellular phone 40 to verify the division pattern so as to restrict the execution of the program.

Each of the second I/F 62 and the second I/F 49 may be a communication interface that provides communication according to a general Universal Serial Bus (USB) standard.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A mobile communication terminal comprising:
a communication unit that communicates with an IC card detachably mounted onto the mobile communication terminal;
a wireless communication unit that provides wireless communication using user information stored in the IC card;
a contents acquisition unit that acquires contents using the user information stored in the IC card;
a contents storage unit that stores the contents acquired by the contents acquisition unit in a form so as to be associated with user identification information acquired from the IC card;
a verification unit that verifies whether or not the user identification information acquired from the IC card matches the user identification information, which is stored in the contents storage unit so as to be associated with the contents to be outputted, when the contents stored in the contents storage unit are outputted to the IC card;
an output permission determination unit that determines whether or not output of the contents should be permitted, receiving verification results obtained by the verification unit; and
a contents deleting unit,
wherein the contents acquisition unit externally acquires the contents and output restriction information, which indicates at least one of whether or not external output of the contents via the wireless communication unit should be permitted and conditions for externally outputting the contents,
wherein the contents storage unit stores the contents so as to be associated with the output restriction information,
wherein the output permission determination unit determines whether or not output of the contents should be permitted, based upon the output restriction information acquired by the contents acquisition unit and the verification results obtained by the verification unit, and wherein when the communication unit has completed outputting the contents to the IC card, the contents deleting unit deletes the outputted contents stored in the contents storage unit.

2. A mobile communication terminal comprising:

a communication unit that communicates with an IC card detachably mounted onto the mobile communication terminal;

a wireless communication unit that provides wireless communication using user information stored in the IC card;

a contents acquisition unit that acquires contents using the user information stored in the IC card;

a contents storage unit that stores the contents acquired by the contents acquisition unit in a form so as to be associated with user identification information acquired from the IC card;

a verification unit that verifies whether or not the user identification information acquired from the IC card matches the user identification information, which is stored in the contents storage unit so as to be associated with contents to be outputted, when the contents stored in the contents storage unit are outputted to the IC card; and an output permission determination unit that determines whether or not output of the contents should be permitted, receiving verification results obtained by the verification unit, wherein the communication unit outputs the contents, or the contents and the output restriction information thereof, to the IC card, receiving determination results obtained by the output permission determination unit, the mobile communication terminal further comprising a contents deleting unit, wherein when the communication unit has completed outputting the contents to the IC card, the contents deleting unit deletes the outputted contents stored in the contents storage unit.

3. A mobile communication terminal according to claim 2, wherein when a payment is conducted for the acquired contents, the contents acquisition unit uses the user information stored in the IC card, and wherein the contents acquisition unit externally acquires the contents via the wireless communication unit.

4. A mobile communication terminal according to claim 2, wherein the communication unit includes a first interface and a second interface, wherein the first interface is a communication interface compliant with an IC card standard, and wherein the second interface is a communication interface compliant with one of a memory card standard and a USB standard.

5. A mobile communication terminal according to claim 2, wherein the IC card comprises:

a user information storage unit configured to store the user information which is to be used by the mobile communication terminal for performing wireless communication;

an IC card communication unit that communicates with the mobile communication terminal;

an IC card contents storage unit that stores the contents and the output restriction information received from the mobile communication terminal; and an IC card output permission determination unit, wherein when the IC card output permission determination unit receives an output instruction to output the contents from the mobile communication terminal, the IC card output permission determination unit being configured to determine whether or not output of the contents to the mobile communication terminal should be permitted based upon the output restriction information and attributes of the mobile communication terminal.

6. A mobile communication terminal according to claim 5, wherein the IC card communication unit includes a first interface and a second interface, wherein the first interface is a communication interface compliant with an IC card standard, and wherein the second interface is a communication interface compliant with one of a memory card standard and a USB standard.

7. A storage medium encoded with a machine readable computer program code for executing wireless communication for a mobile communication terminal, the storage medium including instructions for causing a computer to implement a method comprising the steps of:

communicating with an IC card detachable mounted onto the mobile communication terminal;

providing wireless communication using user information stored in the IC card;

acquiring contents using the user information stored in the IC card;

storing the contents in a form so as to be associated with user identification information acquired from the IC card;

verifying whether or not the user identification information acquired from the IC card matches the user identification information, which is stored in the storing step so as to be associated with the contents to be outputted, when the stored contents are outputted to the IC card; and determining whether or not output of the contents should be permitted, receiving verification results obtained in the verifying step, wherein the acquiring step externally acquires the contents and output restriction information, which indicates at least one of whether or not external output of the contents via the wireless communication should be permitted and conditions for externally outputting the contents, wherein the storing step stores the contents so as to be associated with the output restriction information, and wherein the determining step determines whether or not output of the contents should be permitted, based upon the output restriction information acquired in the acquiring step and the verification results obtained in the verifying step, wherein the communicating step outputs the contents, or the contents and the output restriction information thereof, to the IC card based on receiving determination results obtained in the determining step, the method further comprising a step of:

when the communicating step has completed outputting the contents to the IC card, deleting the outputted contents stored in the storing step.

8. A storage medium encoded with a machine readable computer program code for executing a-wireless communication for a mobile communication terminal, the storage medium including instructions for causing a computer to implement a method comprising the steps of:

communicating with an IC card detachably mounted onto the mobile communication terminal;

providing wireless communication using user information stored in the IC card;

acquiring contents using the user information stored in the IC card;

storing the contents in a form so as to be associated with user identification information acquired from the IC card;

verifying whether or not the user identification information acquired from the IC card matches the user identification information, which is stored in the storing step so as to be associated with the contents to be outputted, when the stored contents are outputted to the IC card; and determining whether or not output of the contents should be permitted, receiving verification results obtained in the verifying step, wherein the communicating step outputs the contents, or the contents and the output restriction information thereof, to the IC card, receiving determination results obtained in the determining step, the method further comprising a step of:

when the communicating step has completed outputting the contents to the IC card, deleting the outputted contents stored in the storing step.

9. A storage medium according to claim 8, wherein when a payment is conducted for the acquired contents, the acquiring step uses the user information stored in the IC card, and wherein the acquiring step externally acquires the contents via wireless communication.

10. A storage medium according to claim 8, wherein the communicating step includes:

communicating via a first interface compliant with an IC card standard, and communicating via a second interface compliant with one of a memory card standard and a USB standard.

11. A storage medium according to claim 8, further comprising the steps of:

causing the IC card to store the user information which is to be used by the mobile communication terminal for performing wireless communication;

causing the IC card to communicate with the mobile communication terminal;

causing the IC card to store the contents and the output restriction information received from the mobile communication terminal; and causing the IC card to determine whether or not output of the contents to the mobile communication terminal should be permitted, based upon the output restriction information and attributes of the mobile communication terminal, when an output instruction to output the contents from the mobile communication terminal is received.

12. A storage medium according to claim 11, wherein the communicating step includes:

communicating via a first interface compliant with an IC card standard, and communicating via a second interface compliant with one of a memory card standard and a USB standard.

13. A mobile communication terminal system comprising:

a mobile communication terminal; and an IC card, wherein the mobile communication terminal includes:

a first communication unit that communicates with the IC card detachably mounted onto the mobile communication terminal;

a wireless communication unit that provides wireless communication using user information stored in the IC card;

a contents acquisition unit that acquires contents from external servers using the user information stored in the IC card;

a first contents storage unit that stores the contents acquired by the contents acquisition unit in a form so as to be associated with user identification information acquired from the IC card;

a verification unit that verifies whether or not the user identification information acquired from the IC card matches the user identification information, which is stored in the first contents storage unit so as to be associated with the contents to be outputted, when the contents stored in the first contents storage unit are outputted to the IC card; and a first output permission determination unit that is configured to determine whether or not output of the contents should be permitted, based on receiving verification results obtained by the verification unit, wherein the first communication unit outputs the contents, or the contents and the output restriction information thereof, to the IC card, based on receiving determination results obtained by the first output permission determination unit, wherein the mobile communication terminal further comprises a contents deleting unit, wherein when the first communication unit has completed outputting the contents to the IC card, the contents deleting unit deletes the outputted contents stored in the first contents storage unit, wherein the IC card includes:

a user information storage unit configured to store the user information which is to be used by the mobile communication terminal for performing wireless communication;

a second communication unit that communicates with the mobile communication terminal onto which the IC card is mounted;

a second contents storage unit that stores the contents and the output restriction information thereof received via the mobile communication terminal; and a second output permission determination unit, wherein when the second output permission determination unit receives an output instruction to output the contents from the mobile communication terminal, the second output permission determination unit determines whether or not output of the contents to the mobile communication terminal should be permitted based upon the output restriction information with respect to the contents and attributes of the mobile communication terminal.

14. A mobile communication terminal system comprising:

an IC card including a user information storage unit that stores user information and a communication unit that externally communicates; and a mobile communication terminal including a card communication unit that communicates with the IC card detachably mounted onto the mobile communication terminal, a wireless communication unit that conducts wireless communication using the user information stored in the IC card, a contents acquisition unit that externally acquires contents from servers via the wireless communication unit, and a contents reproduction unit that reproduces and executes the contents acquired by the contents acquisition unit, wherein the contents acquisition unit acquires the contents which can be divided into a first part and a second part, wherein the mobile communication terminal further includes a first contents storage unit that stores the first part of the contents, the mobile communication terminal transmitting the second part of the contents to the IC card via the communication unit, wherein the IC card further includes a second contents storage unit that stores the second part of the contents received via the communication unit, wherein the contents reproduction unit is configured so as to perform reproduction and execution of the contents using the first part of the contents stored in the first contents storage unit and the second part of the contents stored in the second contents storage unit of the IC card, and wherein the mobile communication terminal further comprising a contents deleting unit configured to delete the first part and the second part of the contents when the contents reproduction unit has completed the reproduction and execution of the contents.

15. A mobile communication terminal system according to claim 14, further comprising a contents providing unit configured to provide dividable contents to a plurality of mobile communication terminals, wherein the contents providing unit provides contents, which have dividable parts that differ from one another, to the plurality of mobile communication terminals, and wherein when an IC card mounted onto a mobile communication terminal stores the second part that corresponds to the first part of the contents stored in the first contents storage unit, the contents reproduction unit of the mobile communication terminal performs reproduction and execution of the contents.

* * * * *